United States Patent [19]

Winzer

[11] 4,396,411
[45] Aug. 2, 1983

[54] SHEAR FRAME MOUNTING AND POSITIONING MECHANISM

[75] Inventor: Frederick W. Winzer, East Granby, Conn.

[73] Assignee: Emhart Industries, Inc., Farmington, Conn.

[21] Appl. No.: 350,506

[22] Filed: Feb. 19, 1982

[51] Int. Cl.³ .............................................. C03B 5/38
[52] U.S. Cl. ...................................... 65/334; 83/600; 83/640; 83/690
[58] Field of Search .................... 65/332, 334; 83/600, 83/640, 699

[56] References Cited

U.S. PATENT DOCUMENTS

| | | | |
|---|---|---|---|
| 3,567,418 | 3/1971 | Hoette | 65/334 X |
| 3,677,732 | 7/1972 | Dornan | 65/334 X |
| 3,758,286 | 9/1973 | Heyne | 65/334 |
| 4,174,647 | 11/1979 | Dahms | 83/600 X |
| 4,214,497 | 7/1980 | Dahms | 83/640 |

Primary Examiner—Robert L. Lindsay, Jr.
Attorney, Agent, or Firm—H. Samuel Kieser

[57] ABSTRACT

A shear frame mounting and positioning mechanism for linearly reciprocal shear blades in which the shear frame can be adjusted in a horizontal plane in a direction parallel to and perpendicular to the direction of travel of the shear blades. Additionally, the shear frame is tiltable in a vertical plane which is parallel to the direction of movement of the shear blades. A mechanism is provided for locking the shear frame under the feeder spout, the mechanism including means for adjusting the shear frame in a direction perpendicular to the direction of movement of the shear blades. The shear frame can be swung between a position under the feeder spout to a position out from underneath the feeder spout and also raised and lowered in a vertical direction.

15 Claims, 6 Drawing Figures

SHEAR FRAME MOUNTING AND POSITIONING MECHANISM

The present invention relates generally to a mechanism for mounting and positioning a shear frame under a feeder spout. More particularly, this invention relates to such a mechanism for use with a shear frame which contains at least one set of linearly reciprocable shear blades.

BACKGROUND OF THE INVENTION

In U.S. Pat. No. 3,567,418, issued to H. Hoette on Mar. 2, 1971, the disclosure of which is incorporated herein by reference in its entirety, there is shown a mechanism for mounting a straight-line shear frame underneath a feeder spout. According to this patent, the mounting mechanism permits the shear frame, and its associated shear mechanism, to be swung in a horizontal plane from its active position underneath the feeder outlet to an inactive position out from underneath the feeder orifice. This is desirable when it is necessary to provide maintenance service to the shear mechanism such as changing the shear blades, or when it is desirable to change the orifice ring in the feeder spout. In addition, in the device shown in the Hoette U.S. Pat. No. 3,567,418, the shear frame mounting mechanism provides a means for vertically adjusting the shear frame so that the shear mechanism therein can be positioned in a vertical direction different distances from the feeder orifice. Further, the mechanism disclosed in this patent includes means for releasably clamping the shear frame in its active position under the feeder spout orifice.

In the process of shearing glass gobs from a column of glass delivered to the shearing mechanism by the feeder through the feeder orifice, it is important to the formation of good gobs that the center line of each set of shear blades in a horizontal plane pass through the center line of the orifice in the orifice ring with which each set is associated. Also, the point of overlap of each set of shear blades should coincide as closely as possible with the center line of the associated orifice in the orifice ring through which the glass column issues. Due to tolerances required to manufacture and assemble the various parts of the spout and orifice ring and its support, the actual location of the center line of an orifice in the orifice ring may vary from the theoretical center line location. Additionally, the tolerances required in the manufacture and assembly of the shear assembly, shear frame, and mounting mechanism may result in the point of overlap of the shear blades not being completely in line with the center line of the orifices. Furthermore, when an orifice ring is changed because of wear or the need for different size due to a job change, the orifice center line may change to a different location. It is also desirable that the axis of shear blade travel is maintained perpendicular to the glass column being sheared to prevent tilting or distortion of the gobs.

SUMMARY OF THE INVENTION

In view of the above, it is one object of the present invention to provide a mechanism for mounting and positioning a shear frame under a feeder orifice wherein the shear frame is adjustable in a horizontal plane in the direction of movement of the shear blades.

Another object of the present invention is to provide a mechanism for mounting and positioning a shear frame under a feeder orifice wherein the shear frame is adjustable in a horizontal plane in a direction perpendicular to the direction of movement of the shear blades.

Still another object of the present invention is to provide a mechanism for mounting and positioning a shear frame under a feeder orifice wherein the shear frame is adjustable in a horizontal plane in a direction perpendicular to the direction of movement of the shear blades.

Yet another object of the present invention is to provide a mechanism for mounting and positioning a shear frame under a feeder orifice wherein the shear frame can be adjusted so that the axis of movement of the shear blades is perpendicular to the axis of the orifices through which the glass gobs issue.

A still further object of this invention is to provide an adjustable shear frame mounting mechanism by which the shear frame may be moved from an active position under the feeder orifice to an inactive position out from underneath the feeder orifice.

A still further object of the present invention is to provide a mechanism for mounting and positioning a shear frame under a feeder orifice in which the shear frame may be locked in its active position below the feeder spout.

A still further object of the present invention is to provide a shear frame mounting and positioning mechanism in which the shear frame may be easily removed from attachment to the feeder spout.

These and other objects of the present invention may be achieved according to a preferred embodiment of the invention through the provisions of a mechanism for mounting and positioning a shear frame which comprises a mounting bracket attached to the feeder spout and a vertically orientated shaft having its upper end mounted for rotation in said mounting bracket and carried thereby. A hanger bracket assembly is attached to the lower end of said shaft for holding the shear frame. The hanger bracket is rotatable with said shaft. Means are provided for adjusting the hanger bracket assembly in a horizontal direction relative to said shaft in the direction of movement of the shear blades.

According to another feature of the invention, there are means provided for vertically adjusting the shaft within the mounting bracket.

Yet another feature of the present invention is the provision of a hanger bracket assembly which includes a hanger bracket attached to the shaft, and a support bracket attached to the hanger bracket and which further includes means for adjusting the support bracket in a horizontal direction relative to the hanger bracket in a direction perpendicular to the direction of movement of the shear blades.

A still further feature of the invention is the provision that means for adjusting the hanger bracket assembly in the horizontal plane can also tilt the hanger bracket assembly relative to the hanger shaft in a vertical plane extending parallel to the axis of movement of the shear blades.

Still another feature of the present invention is the provision of a locking and positioning mechanism which can serve to position the shear frame mechanism in a locked position underneath the feeder orifice and which can serve to adjust the shear frame in a direction perpendicular to the direction of movement of the shear blades.

DETAILED DESCRIPTION

Figure 1:
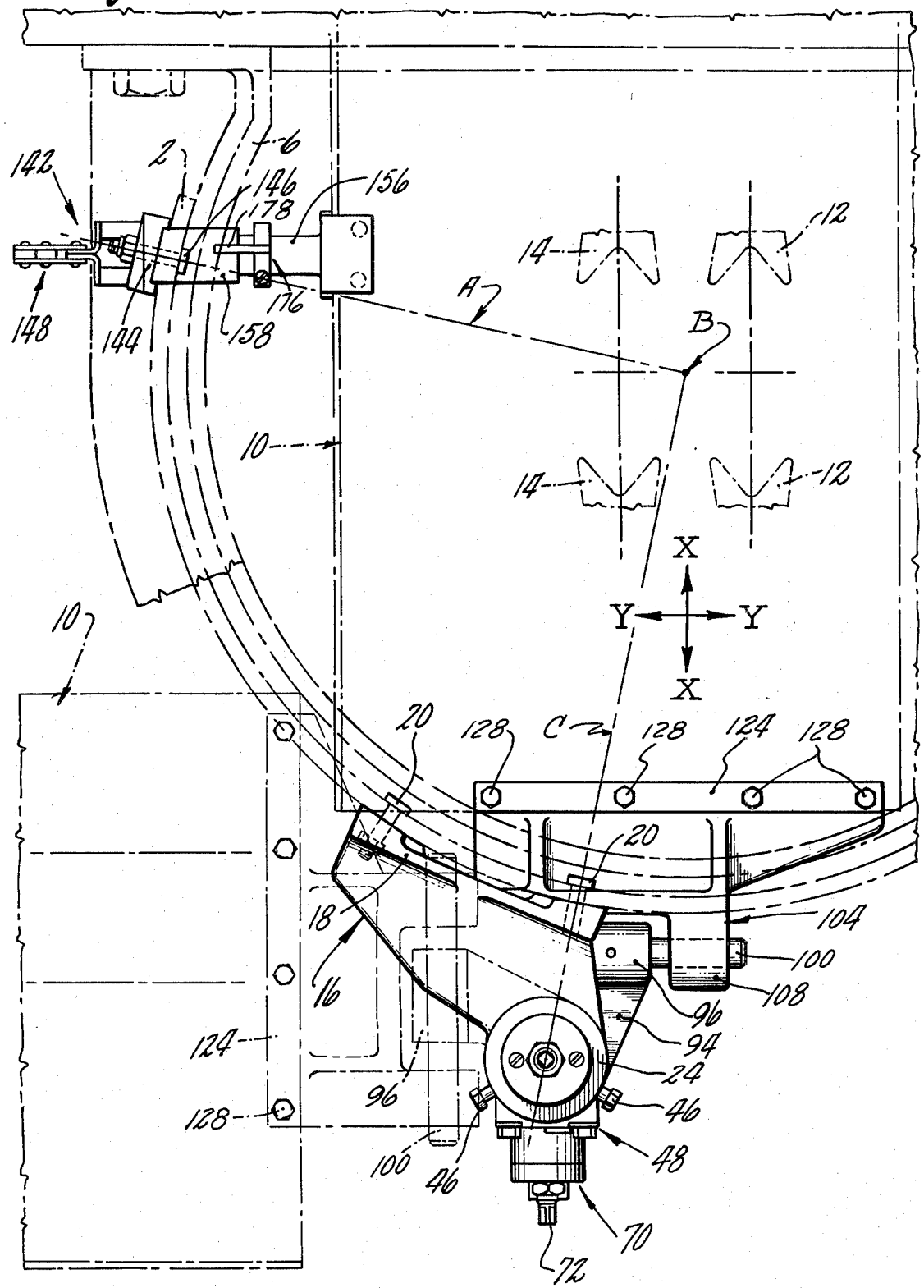
FIG. 1 is a plan view of a shear frame mounting and positioning mechanism constructed in accordance with the present invention and showing it attached to a feeder spout by gibs (shown in phantom) with the shear frame also shown in phantom.
Figure 2:
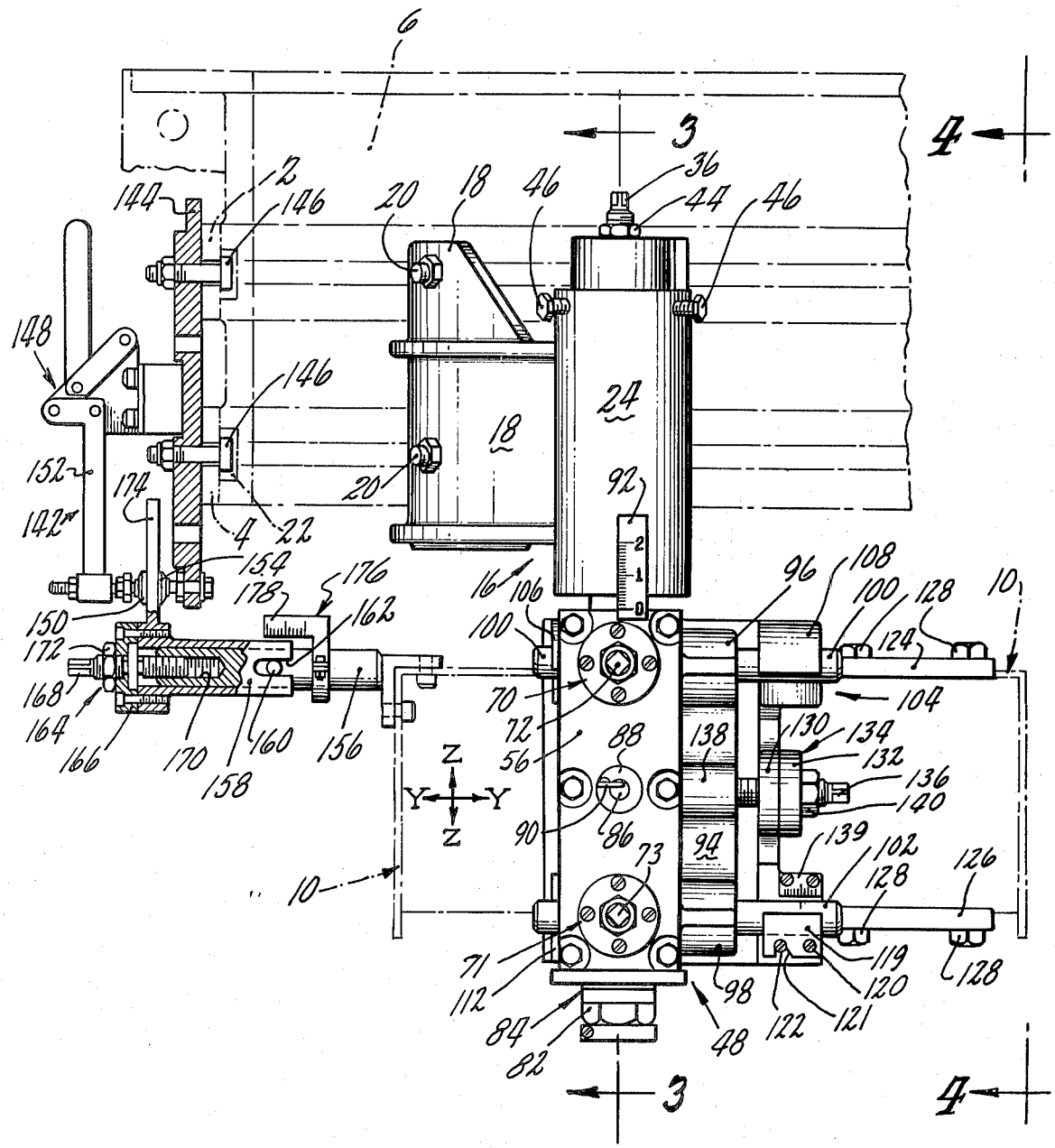
FIG. 2 is a front elevational view showing the shear frame mounting and positioning mechanism of FIG. 1 and showing the shear frame and feeder spout in phantom.

Referring to the drawings and in particular FIGS. 1 and 2, there is shown two vertically spaced arcuate gibs 2 and 4 which are attached to the feeder spout 6 which is generally semicircular. Conventionally, the feeder spout 6 is positioned at the down stream end of a molten glass forehearth. As mentioned in the Hoette U.S. Pat. No. 3,567,418, and as is conventional, the feeder spout 6 may be provided with a bottom orifice (not shown) in which an orifice ring (not shown) is positioned. The orifice ring may contain one or a plurality of orifices depending upon the number of gobs of glass that are to be delivered at one time. For example, it may be single gob, double gob, triple gob or even quadruple gob. Conventionally, means (not shown) are provided for periodically forcing molten glass through the orifices in the orifice ring.

A shear frame 10 (shown in phantom) is mounted beneath the feeder spout 6 by means of the shear frame mounting and positioning mechanism on the present invention. The shear frame 10 may be of the type shown in U.S. Pat. No. 4,174,647 issued Nov. 20, 1979 to Francis A. Dahms, the disclosure of which is incorporated herein by reference in its entirety. As will be seen from this patent, the shear frame provides a mounting for two sets of linearly reciprocable shear blades, shown schematically at 12 and 14 herein. The shear blades of each set reciprocate toward and away from each other along a horizontal axis in the X—X direction as indicated in FIG. 1. Although two sets of shear blades have been shown, it is to be understood that the present invention is adaptable for mounting various types of shear frames whether they include one set or two or more sets of shear blades.

Still referring to FIGS. 1 and 2, the shear frame mounting and positioning mechanism of the present invention includes a mounting bracket 16 having a flange 18 which is attached to the gibs 2 and 4 by means of bolts 20 having their heads mounted in the T-slots 22 formed by gibs 2 and 4 as shown. The mounting bracket 16 also includes a vertically disposed tubular portion 24 in which the upper portion of a vertically orientated hanger shaft 26 is mounted for rotation.

Figure 3:
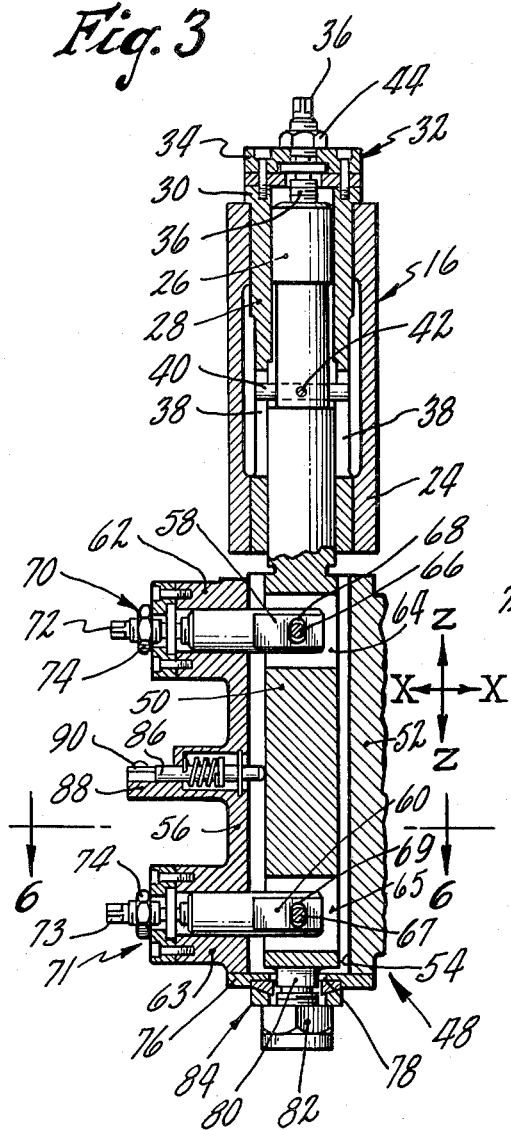
FIG. 3 is a sectional view taken along the lines 3—3 of FIG. 2.

Referring to FIG. 3, a hanger shaft sleeve 28 is provided between the hanger shaft 26 and the internal surface of a tubular portion 24 of the mounting bracket 16 and is provided with a flange 30 at its upper end which rests upon the top surface of the tubular portion 24. A captive screw assembly 32 has its housing 34 suitably attached to the top of the hanger sleeve 28. The inner threaded end of a captive screw 36 is threaded into the upper end of the hanger shaft 26.

The hanger sleeve 28 is provided with a pair of oppositely disposed vertically extending slots 38, 38 in its side wall, which slots are adapted to receive the outer ends of a radially extending pin 40 extending through the hanger shaft 26 and maintained in position by means of a set screw 42.

With the above described arrangement, rotation of the captive screw 36 in one direction results in upward vertical axial movement of the hanger shaft 26 relative to the hanger sleeve 28 and the hanger bracket 16. Rotation of the captive screw 36 in the opposite direction results in downward vertical axial movement of the hanger shaft 26 relative to those members. A locknut 44 may be provided to lock the captive screw 36 to its housing 34 and prevent accidental rotation. The pin member 40 extending through the hanger shaft 26 prevents vertical axial movement of the hanger shaft 26 when the hanger shaft 26 is rotated about its vertical axis relative to the mounting bracket 16 when the shear frame is moved in and out from under the orifice as there is no relative rotation between the hanger shaft 26 and the hanger sleeve 28 and the captive screw 36. Two locking screws 46—46 may be provided in the hanger bracket 16 to prevent rotation of the hanger sleeve 28 and hanger shaft 26 relative to the hanger bracket 16 when the shear frame 10 is swung out from under the orifice. Additionally, the pin member 40 and slots 38—38 provide a stop means to limit axial movement of the shaft 26 relative to the sleeve 28 and mounting bracket 24.

A hanger bracket assembly 48 is attached to a lower rectangular portion 50 of the hanger shaft 26. The hanger bracket assembly 48 includes a hanger bracket 52 having an elongated opening 54 therein which is generally rectangular in cross-section and in which the lower portion 50 of the hanger shaft 26 is received.

A hanger bracket cover 56 is attached to and covers the opening 54 in the hanger bracket 52. The hanger bracket assembly 48 is attached to the hanger shaft 26 by means of two vertically spaced adjusting pins 58 and 60, each of which extends from an opening within its boss 62, 63 on the hanger bracket cover 56 into a vertically elongated slot 64,65 in the hanger shaft 26. A pin member 66, 67 is associated with each of the pins 58, 60 and extends transversely through the hanger shaft 26 and through a vertically elongated opening 68, 69 in the adjusting pins 58 and 60. Each boss 62, 63 has a captive screw assembly 70, 71 attached to it with the inner threaded end of the captive screw 72, 73 being threaded into the outer end of its associated pin member 58, 60. Each captive screw assembly 70,71 may include a locking nut 74 to prevent accidental rotation of the captive screw 72, 73.

The hanger bracket assembly 48 rests on a bottom plate 76 which has an opening 78 through which a cylindrical lower extension 80 of the hanger shaft 26 extends. This opening 78 is so dimensioned as to provide clearance between the hanger shaft 26 and the bottom plate 76. A nut member 82 is threadedly attached to the lower extension 78 of the hanger shaft 26 and is separated from the bottom plate 76 by means of a spherical washer set 84.

Figure 6:
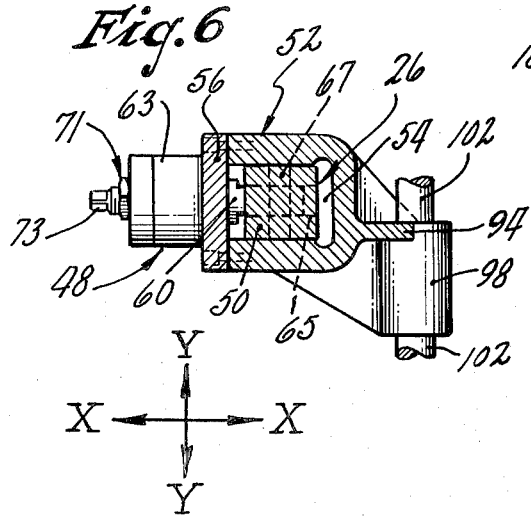
FIG. 6 is a horizontal sectional view taken along the lines 6—6 of FIG. 3.

Referring to FIGS. 3 and 6, and with reference to FIG. 1, it will be noted that the thickness of the hanger shaft 26 in a horizontal direction parallel to the axis of movement of the shear blades (the X—X direction as indicated in the drawings) is less than the thickness of the opening 54 formed by the hanger bracket 52 and the hanger bracket cover 56 so that clearance is provided between the hanger bracket assembly 48 and the hanger shaft 26 in that direction so that relative movement between the hanger bracket assembly 44 and the hanger bracket shaft is possible. In a horizontal direction perpendicular to the axis of movement of the shear blades (the Y—Y direction as indicated in FIG. 6), the lower portion of the hanger shaft 26 is dimensioned to be slidingly supported by the inner walls of the hanger bracket 52.

With the above described arrangement, when both the upper and lower captive screws 72, 73 are rotated in the same direction the hanger bracket assembly 48 will move relative to the hanger shaft 26 horizontally in a direction parallel to the axis of movement of the shear blades (the X—X direction as indicated in the drawings) either toward or away from the feeder orifice depending upon the direction of rotation of the screws 72,73. If only one of the captive screws 72,73 are rotated, or if both are rotated, but in opposite directions, the hanger bracket assembly 48 will tilt in a vertical plane extending parallel to the axis of movement of the shear blades. More specifically, referring to FIG. 3, if the upper captive screw 72 is rotated clockwise, and the lower captive screw 73 is rotated counterclockwise, the upper portion of the hanger bracket assembly 48 will move to the left as seen in FIG. 3 and the lower portion of the hanger bracket assembly 48 will move to the right, thereby causing the hanger bracket assembly 48 to tilt relative to the hanger shaft 26.

As shown in FIGS. 2 and 3, a spring biased plunger 86 is mounted in a boss 88 on the housing bracket cover 56 midway between the upper and lower captive screws 72,73. The plunger 86 extends horizontally in the X—X direction and has its inner end biased against the hanger shaft 26. A scale 90 is attached to a cutaway horizontal portion of the boss 88 whereby the amount of movement of the housing bracket assembly 48 relative to the hanger shaft 26 in the x—x direction may be measured. A scale 92 attached to the upper end of the hanger bracket assembly 48 and extending on the outside of the tubular portion 24 of the mounting bracket 16 provides an indication of the vertical movement of the hanger bracket assembly 48 and hanger shaft 26 relative to the vertically fixed mounting bracket in the Z—Z direction.

A flange 94 extends outwardly from the hanger bracket 52 and includes upper and lower bosses 96 and 98 in which are mounted upper and lower support shafts 100 and 102. The shafts 100 and 102 extend on either side of their bosses 96 and 98 in a direction parallel to one end of the shear frame 10 which is perpendicular to the movement of the shear blades (the Y—Y direction as indicated in the drawings).

Figure 5:
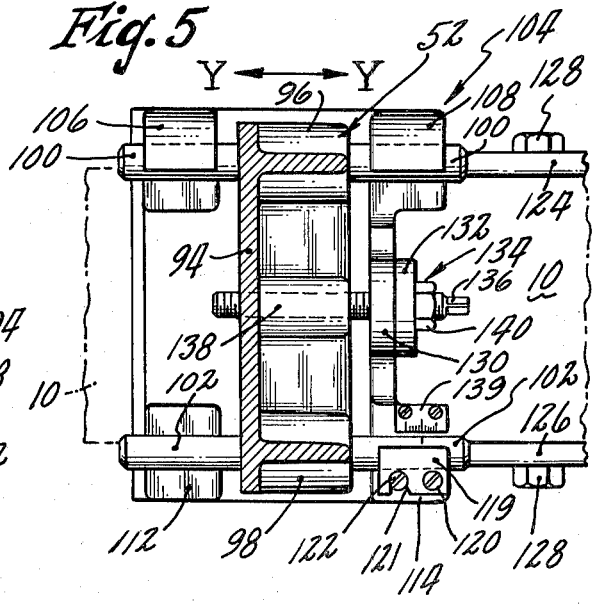
FIG. 5 is a vertical sectional view taken along the lines 5—5 of FIG. 4.

The hanger bracket assembly 48 also includes a support bracket 104 mounted on the hanger bracket 56. The support bracket 104 includes two upper support lugs 106 and 108 having semicircular openings 110 therein whereby the support bracket 104 may be hung on the upper shaft 100 of the hanger bracket 52. Two lower support lugs 112 and 114 are also provided on the support bracket 104 with the opening in each of them including an arcuate portion 116 and a lower horizontal portion 118. At least one of the bottom supporting lugs 112 and 114 is provided with a swinging retaining plate 119 which is pivotable about a screw member 120 from its retaining position as shown in FIGS. 2 and 5 wherein removal of the support bracket 104 is prevented to a non-retaining position below the lower shaft 102 on the hanger bracket 56. The retaining plate 119 includes a slot 121 for passing over the shank of a screw member 122 which serves to lock the plate 119 in the retaining position.

Figure 4:
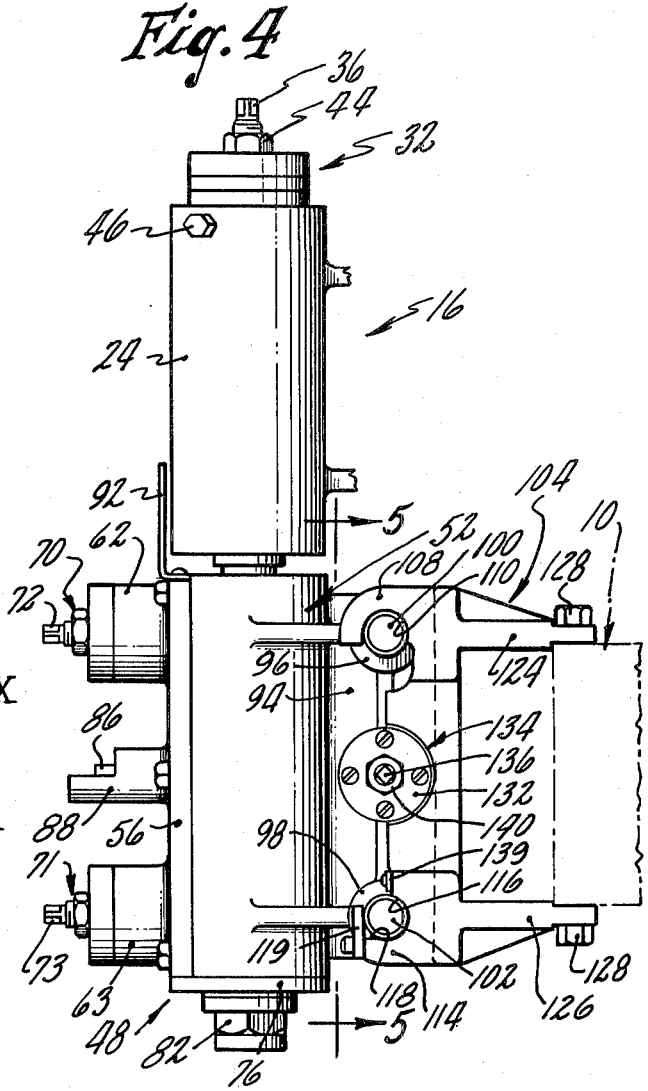
FIG. 4 is a side elevational view taken along the lines 4—4 of FIG. 2.

The support bracket 104 also includes upper and lower support arms 124 and 126 extending parallel to the end of the shear frame 10 as shown in FIGS. 1, 2 and 4. The shear frame 10 is attached to the support arms 124 and 126 by appropriate fastening means such as bolts 128 or the like.

The support bracket 104 further includes a boss 130 to which the housing 132 of a captive screw assembly 134 is attached by screws 136. The threaded end of a captive screw 136 is threaded into an internally threaded boss 138 on the hanger bracket assembly 48. The captive screw 136 extends horizontally axial between the upper and lower support shafts 100 and 102 in a direction parallel thereto and perpendicular to the axis of movement of the shear blades (the Y—Y direction as indicated on the drawings). A locking nut 140 may be provided on the captive screw 136 to prevent accidental rotation thereof.

By virtue of this arrangement, when the captive screw 136 is rotated in one direction, the support bracket 104 and shear frame 10 will move in one direction on the upper and lower shafts 100 and 102, relative to the hanger bracket 52 in the Y—Y direction as indicated in FIG. 5. When the captive screw 136 is rotated in the opposite direction, the support bracket 104 will move along the shafts 100 and 102 in the opposite direction. A scale 139 may be mounted on the support bracket 104 above the lower support shaft 102 to provide an indication of the movement of the support bracket 104 relative to a scribed line on the hanger bracket shaft 102.

To remove the support bracket 104 and the attached shear frame 10, from the hanger bracket 56, the shear frame 10 is perferably rotated out from underneath the feeder spout orifice. The captive screw assembly is then removed by removing the captive screw assembly 134, including backing the captive screw 136 out of the threaded boss 138. After swinging the retainer plate 116 out of the way, the support bracket 104 may be tilted upwardly until the lower support lugs 112-114 clear the lower support shaft 102 on the hanger bracket 56, whereupon the shear frame 10, along with the support bracket 104, may be lifted vertically upwardly to clear the upper support lugs 106, 108 and the shear frame, along with the support bracket may be released from its mounting on the feeder spout.

Referring to FIGS. 1 and 2, a locking and positioning assembly 142 is provided which includes a clamp mounting plate 144 which is adjustably mounted on the feeder spout 6 by means of bolts 146 which have their heads positioned in the T-shaped slots formed by the gibs 2 and 4. As shown in FIG. 1, according to the preferred embodiment, the locking and positioning assembly 142 is so positioned around the feeder spout in relation to the hanger bracket assembly that a radius "A" passing through the center line "B" of the orifice of the feeder spout and the center of the clamp mounting plate 144 is angularly offset 90° with respect to a radius "C" passing through the center axis of the tubular portion 26 of the mounting bracket 16 and the center line "B" of the orifice of the feeder spout.

A toggle clamp 148 is mounted on the clamp mounting plate 144 and includes a swivel pad 150 on its lower arm 152. A swivel stop pad 154 is mounted on the clamp mounting plate 144 in a position opposite the swivel pad 150 of the toggle clamp 148 when the toggle clamp 148 is in its closed position.

An adjusting shaft 156 is attached to the shear frame 10 along one side thereof and extends toward the clamp mounting plate 144 when the shear frame 10 is in its position underneath the feeder spout orifice. An adjusting sleeve 158 is positioned over the outer end of the adjusting shaft 156 and has axial sliding movement on the adjusting shaft 156. The adjusting sleeve 158 is prevented from rotating on the adjusting shaft 156 by a pin 160 fixed in the adjusting shaft 156 and which projects into a slot 162 in the adjusting sleeve 158.

A captive screw assembly 164 has its housing 166 attached to the outer end of the adjusting sleeve 158 and includes a captive screw 168 which has its inner threaded portion threadedly received in a threaded bore 170 in the end of the adjusting shaft 156. A locking nut 172 may be mounted on the outer end of the captive screw 168 to prevent accidental rotation of the captive screw 168 when the nut 72 is tightened. A clamping plate 174 extends upwardly from the adjusting sleeve 158 at the outer end thereof and is positioned to be clamped between the swivel pad 150 on the toggle clamp 148 and the stop pad 154 on the clamp mounting bracket 144 when the shear frame 10 is positioned under the feeder spout orifice and the toggle clamp 148 is closed. When the toggle clamp 148 is opened the lower arm 152 and the swivel pad 150 pivots upward and frees the clamping plate 174 so that the shear frame 10 along with the adjusting sleeve 158 and adjusting shaft 156 can be swung out from underneath the feeder spout orifice.

By virtue of the captive screw assembly 164 when the shear frame 10 is clamped in position under the feeder spout orifice by the toggle clamp 148, and the captive screw 168 is rotated in one direction, it will force the adjusting shaft 156 to move horizontally axially in one direction perpendicular to the direction of movement of the shear blades (the Y—Y direction as indicated in the drawings) relative to the adjusting sleeve 158, thus moving the shear frame 10 in that direction. Rotation of the captive screw 168 in the other direction will cause the opposite movement of the adjusting shaft 156 and shear frame 10. As will be explained below, this adjustment should be made in conjunction with the adjustment of the captive screw 136 associated with the support bracket 104. A scale 176 may be mounted on the adjusting shaft 156 as shown in FIG. 2. The scale 176 includes a calibrated arm 178 which overlaps the adjusting sleeve 158 to provide a means for measuring the amount of movement of the adjusting shaft 156 relative to the adjusting sleeve 158.

In mounting the shear frame mounting and positioning mechanism, the mounting bracket 16 is attached to the feeder spout and positioned such that the center lines of the axis of movement of the shear blades pass through the center lines of the axis of the associated orifice in the orifice ring. As described above, the locking and positioning assembly is 90° offset with respect to the angle between the center line of the feeder orifice and the center line of the tubular portion of the mounting bracket. Once having mounted the shear frame 10 and its associated shear mechanism in this manner, by virtue of the present invention, the shear frame 10 can be adjusted to compensate for various misalignments that result during the mounting procedure or during maintenance or repair procedures. If, for example, it is found that the center line of the shear blade overlap is not coincident with the axis of the orifice in the orifice ring then the shear frame, and its associated shear mechanism can be adjusted in the X—X direction by virtue of the captive screws 72, 73 mounted in the hanger bracket cover 56 as hereinbefore described. In the event that the travel of the midsection of each shear blade is not coincident with the perpendicular center line of the orifice in the orifice ring, the shear frame can be adjusted in the Y—Y direction as shown in the drawings which is perpendicular to the axis of the shear blade travel. This can be accomplished by rotating the captive screw 136 associated with the support bracket 104 in conjunction with the rotation of the captive screw 168 associated with the locking and positioning mechanism 142, so that the shear frame 10 and its associated mechanism may be moved in the Y—Y direction as indicated on the drawings. Further, as previously described herein, the shear frame 10 may be raised and lowered in a vertical direction by means of the captive screw 36 mounted on the hanger sleeve 28. This should preferably be done with the toggle clamp 148 open. In the event the travel of the shear blades is not perpendicular to the axis of the orifices in the orifice ring, the shear frame may be tilted by rotating one of the captive screws 72, 73 in one direction and the other of the captive screws 72, 73 in the other direction. When all the necessary adjustments are made, the toggle clamp 148 is closed and the shear frame 10 is locked in position under the orifice.

While reference has been made above to a preferred embodiment of the invention, various modifications and alterations will readily suggest themselves to one skilled in the art without departing from the spirit of the present invention. Therefore, it is intended that the scope of this invention be ascertained by reference to the following claims.

What is claimed is:

1. A mechanism for mounting and positioning a shear frame containing at least one set of linearly reciprocal shear blades under a feeder spout, said mechanism comprising:
   a. a mounting bracket for attachment to said feeder spout;
   b. a vertically orientated shaft having its upper end mounted for rotation in said mounting bracket and carried thereby;
   c. a hanger bracket assembly attached to the lower portion of said shaft for attachment to the shear frame, said hanger bracket assembly being rotatable with said shaft; and
   d. means for adjusting said hanger bracket assembly in a horizontal direction relative to said shaft in the direction of movement of the shear blades.

2. The mechanism of claim 1 further including means for vertically adjusting said shaft within said mounting bracket.

3. The mechanism of claim 1 wherein said hanger bracket assembly includes a hanger bracket attached to said shaft, and a support bracket attached to said hanger bracket, and further including means for adjusting said support bracket in a horizontal direction relative to said hanger bracket in a direction perpendicular to the direction of movement of the shear blades.

4. The mechanism of claim 3 further including means releasably attaching said support bracket to said hanger bracket.

5. The mechanism of claim 1 wherein said means for adjusting said hanger bracket assembly can tilt said hanger bracket assembly relative to said shaft in a vertical direction extending parallel to the axis of movement of the shear blades.

6. The mechanism of claim 1 further including means for locking said shear frame under the feeder spout.

7. The mechanism of claim 6 wherein the means for locking said shear frame include means for moving the shear frame in a direction perpendicular to the direction of travel of the shear blades.

8. The mechanism of claim 1 wherein said means for adjusting said hanger bracket includes two vertically spaced captive screws mounted on said hanger bracket, and pin means attached to said shaft and threadedly engaged by said captive screws.

9. The mechanism of claim 3 wherein said means for adjusting said support bracket includes a captive screw mounted on said support bracket and threadedly engaging said hanger bracket.

10. The mechanism of claim 7 wherein said means for locking said shear frame include a captive screw assembly.

11. A mechanism for mounting and positioning a shear frame containing at least one set of linearly reciprocal shear blades under a feeder spout, said mechanism comprising:
   a. a mounting bracket for attachment to said feeder spout;
   b. a vertically orientated shaft having its upper end mounted for rotation in said mounting bracket and carried thereby;
   c. a hanger bracket assembly attached to the lower portion of said shaft for attachment to said shear frame, said hanger bracket assembly being rotatable with said shaft; and
   d. means for tilting said hanger bracket relative to said shaft in a vertical plane extending parallel to the axis of movement of the shear blades.

12. A mechanism for mounting and positioning a shear frame containing at least one set of linearly reciprocal shear blades under a feeder spout, said mechanism comprising:
   a. a mounting bracket for attachment to said feeder spout;
   b. a vertically orientated shaft having its upper end mounted for rotation in said mounting bracket and carried thereby; and
   c. a hanger bracket assembly attached to the lower portion of said shaft for attachment to said shear frame, said hanger bracket assembly being rotatable with said shaft and including a hanger bracket attached to the shaft and a support bracket attached to said hanger bracket and further including means for adjusting said support bracket in a horizontal direction relative to said hanger bracket in a direction perpendicular to the direction of movement of said shear blades.

13. The mechanism of claim 12 further including means for locking said shear frame in a position under the feeder spout.

14. The mechanism of claim 13 wherein the means for locking said shear frame include means for adjusting the shear frame in a direction perpendicular to the direction of travel of the shear blades.

15. A mechanism for mounting and positioning a shear frame containing at least one set of linearly reciprocal shear blades under a feeder spout, said mechanism comprising:
   a. a mounting bracket for attachment to said feeder spout;
   b. a vertically orientated shaft having its upper end mounted for rotation in said mounting bracket and carried thereby;
   c. a hanger bracket assembly attached to the lower portion of said shaft for attachment to the shear frame, said assembly including a hanger bracket attached to said shaft, a support bracket for attachment to said shear frame, and means releasably mounting said support bracket on said hanger bracket.

* * * * *